(12) United States Patent
Zhang et al.

(10) Patent No.: US 10,525,629 B2
(45) Date of Patent: Jan. 7, 2020

(54) ADDITIVE MANUFACTURING PROCESS DISTORTION COMPENSATION SYSTEM

(71) Applicant: Hamilton Sundstrand Corporation, Charlotte, NC (US)

(72) Inventors: Qingqing Zhang, Shanghai (CN); Yanzhi Chen, Shanghai (CN); Ranadip Acharya, Rocky Hill, CT (US); Tahany Ibrahim El-Wardany, Bloomfield, CT (US); Vijay Narayan Jagdale, South Windsor, CT (US); Changle Li, Shanghai (CN); Colette Opsahl Fennessy, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 37 days.

(21) Appl. No.: 15/723,986

(22) Filed: Oct. 3, 2017

(65) Prior Publication Data
US 2019/0099951 A1 Apr. 4, 2019

(51) Int. Cl.
| B29C 64/386 | (2017.01) |
| B33Y 50/00 | (2015.01) |
| B33Y 10/00 | (2015.01) |
| G05B 19/40 | (2006.01) |
| G06T 17/20 | (2006.01) |
| G05B 19/4099 | (2006.01) |
| B33Y 80/00 | (2015.01) |

(Continued)

(52) U.S. Cl.
CPC ............ *B29C 64/386* (2017.08); *B33Y 50/00* (2014.12); *G05B 19/4099* (2013.01); *G06T 17/205* (2013.01); *B29C 64/141* (2017.08); *B33Y 10/00* (2014.12); *G05B 2219/49023* (2013.01)

(58) Field of Classification Search
CPC ......... B33Y 50/80; B33Y 80/00; B33Y 10/00; A61C 7/002; G05B 19/4099; G05B 2219/49023; G06T 17/205; G06T 19/20
USPC ........................................................ 700/118
See application file for complete search history.

(56) References Cited

U.S. PATENT DOCUMENTS

| 7,936,352 B2 | 5/2011 | Baran | |
| 2014/0107823 A1* | 4/2014 | Huang | G06F 17/50 700/98 |
| 2015/0352794 A1 | 12/2015 | Nguyen | |

(Continued)

OTHER PUBLICATIONS

Search Report for European Application No. 18198118.4; Application Filing Date Oct. 2, 2018; dated Jan. 22, 2019 (10 pages).

*Primary Examiner* — Michael J Brown
(74) *Attorney, Agent, or Firm* — Cantor Colburn LLP (57) ABSTRACT

An additive manufacturing (AM) system comprising a process distortion compensation computing system configured to determine a digital nominal model that represents a physical target object excluding a distortion, and a digital distortion model that represents the physical target object including at least one distortion. The AM system further comprises an AM peripheral device configured to form a three-dimensional physical object based on a digital compensation model. The process distortion compensation computing system determines a material volume difference between the digital nominal model and the digital distortion model, and generates the digital compensation model that compensates for the material volume difference.

18 Claims, 6 Drawing Sheets

(51) Int. Cl.
 *G06T 19/20* (2011.01)
 *B29C 64/141* (2017.01)

(56) References Cited

U.S. PATENT DOCUMENTS

2016/0086376 A1   3/2016  Tang
2016/0167306 A1   6/2016  Vidimce
2016/0243644 A1   8/2016  Moneta et al.
2016/0320771 A1   11/2016 Huang

* cited by examiner

ADDITIVE MANUFACTURING PROCESS DISTORTION COMPENSATION SYSTEM

BACKGROUND

The disclosure relates generally to product manufacturing, and more particularly, to additive manufacturing processes.

Additive manufacturing includes building two-dimensional layers (or slices), on a layer by layer basis to manufacture three-dimensional components. For laser powder bed diffusion and laser directed energy deposition processes Each layer is generally very thin (for example between 20 to 100 microns) and many layers are formed in a sequence with the two-dimensional (2D) shape varying on each layer to provide the desired final three-dimensional (3D) profile. On the other hand wire based additive manufacturing processes can deposit layers with mm height. In contrast to traditional "subtractive" manufacturing processes where material is removed to form a desired component profile, additive manufacturing processes progressively add material to form a net shape or near net shape final component.

Depending on process parameters and additive manufacturing process types, additively manufactured components demonstrate significant amount of distortion and residual stress. To obtain shape accuracy, various techniques are employed to compensate for the dimensional change during the part design step. The current process of distortion compensation relies on an expensive iterative approach which subtracts the computed distortion in each step to reach a final shape that upon distortion yields accurate shape. Current methods obtain the compensated geometry only from the spatial layout gap between the nominal and distorted models.

BRIEF DESCRIPTION

According to a non-limiting embodiment, an additive manufacturing (AM) system comprises a process distortion compensation computing system configured to determine a digital nominal model that represents a physical target object excluding a distortion, and a digital distortion model that represents the physical target object including at least one distortion. The AM system further comprises an AM peripheral device configured to form a three-dimensional physical object based on a digital compensation model. The process distortion compensation computing system determines a material volume difference between the digital nominal model and the digital distortion model, and generates the digital compensation model that compensates for the material volume difference.

According to another non-limiting embodiment, a method of fabricating a physical three-dimensional (3D) product using an additive manufacturing (AM) system comprises generating a digital nominal model that represents a physical target object excluding a distortion. The method further includes generating a digital distortion model that represent the physical target object including at least one distortion. The method further includes determining a material volume difference between the digital nominal model and the digital distortion model. The method further includes generating a digital compensation model that compensates for the material volume difference. The method further includes forming, via an electronic AM peripheral device, the physical 3D product based on the digital compensation model.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

Current methods that obtain a compensated geometry only from the spatial layout gap between the nominal and distorted models ignore the physical process during material shrinkage of an AM fabricated product which can occur during the cooling phase of the AM manufacturing process. Development of a physics based model enables reaching the distortion compensated geometry more quickly and efficiently by understanding the shrinkage physics.

Various non-limiting embodiments provide an additive manufacturing system configured to perform distortion compensation of a working object based on the physical process of material shrinkage that occurs while the fabricated AM product cools. The additive manufacturing system implements a physics-based model that enables reaching the distortion compensated geometry more quickly and efficiently by determining or identifying the shrinkage of the working object. Therefore, instead of performing only geometry compensation by reversing the shape of the input distorted model as performed by conventional additive manufacturing systems, various non-limiting embodiments described herein modifies the object model by physical factors to take into account material shrinkage that occurs during the manufacturing process.

In one or more embodiments, the physical factors utilized to compensate for material shrinkage is determined using a discrete representation of a 3D model such that distortion can be captured in term of a geometric representation. In one example, non-uniform rational B-splines (NURBS) are generated from the discrete representation. The NURBS include a set of control points that define a surface of a 3D model representing the working target object. A distortion compensation process can be employed which enables the compensation of volume changes induced by line and angel deviation caused by shape distortion. The volume changes can result from material shrinkage which changes the shape and/or volume of the AM fabricated product during the cooling phase.

When the additive manufacturing process distortion compensation system performs a compensating iteration process, parametric refinement of geometry modifications can compensate for the amount of volume modifications and shape modifications of the working target object by controlling a set of parameters which are captured from the deformation during additive manufacture. Accordingly, the physical factors employed by described herein includes is based on a configuration compensation due to the part shape change and a shrinkage compensation due to material volume change.

The various non-limiting embodiments described herein provide a framework of an AM fabrication process that can determine the process parameters and scan strategy that will result in accurate shape and dimension of additively made components. In this manner, the need for costly and cumbersome experiments to hone in on the optimal process parameters can be eliminated. In addition, high quality additive parts can be rapidly generated within targeted geometrical and shape tolerances.

Figure 1:
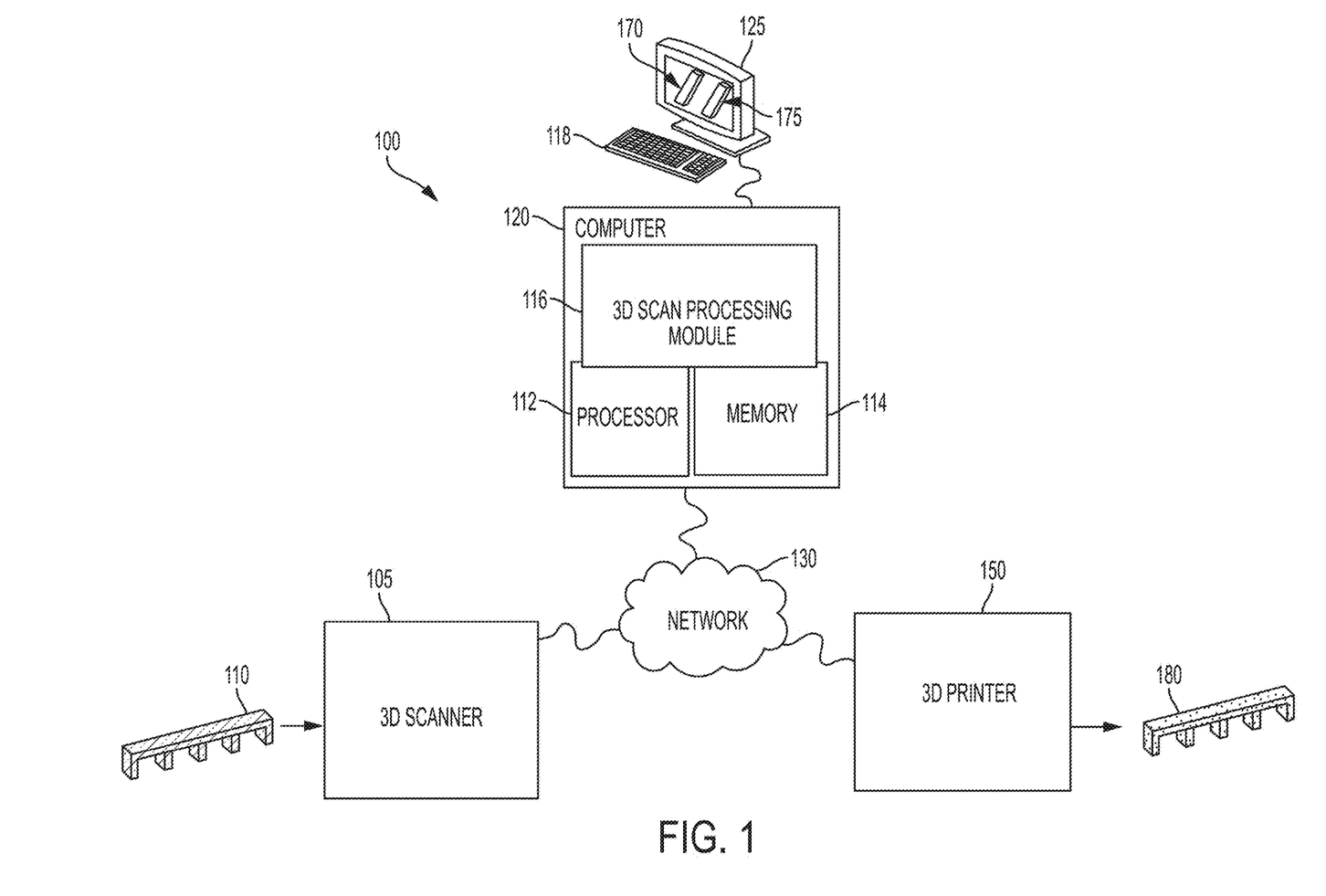
FIG. 1 is a block diagram of a computing system capable of performing an additive manufacturing process distortion compensation process according to a non-limiting embodiment.

Turning now to FIG. 1, an additive manufacturing system 100 is illustrated according to a non-limiting embodiment. The additive manufacturing system 100 is capable of performing an AM process to create a physical 3D product or object 180 based on an input digital model 170 which represents a physical target object 110. The input digital model 170 can be referred to as a digital nominal model 170. As shown in FIG. 1, the additive manufacturing system 100 includes a 3D scanner 105. The 3D scanner 105 is employed to capture visual representations of a physical object 110. The 3D scanner 105 can include cameras or sensors employed to generate dense point clouds or polygon meshes used in 3D modeling. The 3D scanner 105 can be implemented using technology including but not limited to: 3D digitizers; laser scanners; structured light scanners; laser pulsed scanners; white light scanners; (Light Detection And Ranging) LIDAR; digital cameras; and structured light 3D sensors and/or cameras. In one or more embodiments, the structured 3D sensors include "light coding" 3D depth acquisition sensors which codes working scene that includes a target object with near-IR light. The returned light is detected by the "light coding" 3D depth acquisition sensor, and the light distortions included in the returned light define a light coding indicate the location of the target object with respect to the working scene. A CMOS image sensor can be utilized to read the coded light back from the scene using various algorithms to triangulate and extract the 3D data.

In at least one non-limiting embodiment, the system 100 can be employed to perform 3D printing as an application of 3D scanning. For instance, a target working object 110 is scanned by 3D scanner 105 so as to generate scan data, including 2D visualizations (e.g., photographic images) and/or geometric measurements representing the physical surface of object 110. Object 110 can be a physical 3D article consisting of differing geometric shapes. The scan data can be transmitted from the 3D scanner 105 to an AM process distortion compensation computing system 120. The AM process distortion compensation computing system 120 includes a 3D Scan Processing module 116, which processes the received scan data to generate a digital nominal model 170 of the scanned object 110. The digital nominal model 170 can be a computer-generated 3D model, for example a 3D model that can be modified using CAD software.

The digital nominal model 170 can be further processed, using 3D Scan Processing Software stored in the memory 114, for example, to slice the digital nominal model 170 into several cross sections according to a predesignated thickness for each layer, so that an AM peripheral device 150 can construct each layer sequentially. In at least one embodiment, the AM peripheral device 150 includes, but is not limited to, a 3D printer 150. Each layer's construction can be analogous to printing of an image with a particular thickness, or volume. After performing a number of AM iterations by the AM peripheral device 150 (e.g., after all layers have been printed), a 3D AM built product 180 (e.g., printed product 180) can be produced having the same dimensions as the input model (e.g., digital nominal model 170). It should be appreciated that the embodiments can be used to realize other applications of 3D scanning techniques in addition to 3D printing, such as digital archiving, reverse engineering, manufacturing, and inspection. In addition, some embodiments employ 3D printing without any 3D scanning, such as when the digital nominal model 170 is built on the process distortion compensation computing system 120 using a 3D modelling program (e.g., CAD software). The AM peripheral device 150 implements 3D printing using specific techniques associated with 3D printing, for example Stereolithography (STL), also referred to as "SLA" or "SA".

The 3D scanner 105 is configured to implement various approaches to 3D scanning that are based on imaging principles. For example, 3D scanner 105 can employ photogrammetry and/or light-based 3D scanning techniques for generating a visual representation of object 110. In some implementations, the 3D scanner is employed to take multiple 2D pictures of object 110. The 2D images can be captured from various positions, representing different perspectives, around the object 105. According to some embodiments, the 3D scanner 105 includes one or more cameras arranged at various angles about the object 110. Different viewpoints/camera angles associated with the 2D images captured by 3D scanner 105 can be employed to construct a 3D digital model from the scan data. Thereafter, the various 2D images can be fused, or otherwise combined, so as to generate a 3D mesh of the object.

In some implementations, the 3D scanner 105 is configured to transmit patterns of light, for example pulsed light, onto object 110. The edges of lines in the light pattern can be used to calculate a distance between the 3D scanner 105 and the surface of scanned object 110. Based on the deformations of the light patterns, a model form of the object can be determined and used to create a 3D mesh, or digital replica of object 110. Alternatively, 3D scanner 105 can include sensors used to measure various angles of reflected light laser which it can translate into coordinates of object 110 and therefore into a 3D mesh. In some implementations, the 3D scanner 105 scans object 105 using a laser, for example a laser line or a single laser point. According to such embodiments, 3D scanner 105 includes one or more sensors employed to detect the laser light that is reflected from object 110. Subsequently, the process distortion compensation computing system 120 can calculate a distance between object and the laser source of 3D scanner 105 using techniques such as triangulation. As a laser light from 3D scanner 105 is reflected from the scanned object 110, the 3D Scan processing module 116 can be employed to calculate angles associated with the light detected by the sensors and, thereby determine various geometric measurements for the surface of object 110.

The process distortion compensation computing system 120 includes a processor 112 and a memory 114. The process distortion compensation computing system 120 can be connected to a computer network 130, which can be a private network, a public network, a virtual private network, etc. The computer network 130 can be implemented as either a wired network (e.g., Ethernet) or a wireless network. The various devices of system 100, including 3D scanner 105, process distortion compensation computing system 120, and the AM peripheral device 150 can be connected via network 130. Examples of computer networks include, but are not limited to, a local area network (LAN), a wide area network (WAN), and the Internet. As shown in FIG. 1, the computer network 130 is a wired network so that devices can communicate, or otherwise transmit, data via physical connections such as Universal Serial Bus (USB) connectors. In some implementations, computer network 130 can be a wireless local area network (WLAN), such as an IEEE 802.n network. Thus, 3D scanner 105 and the process distortion compensation computing system 120, for example, are communicatively coupled, and capable of wireless transmission of scan data via the computer network 130.

The processor 112 can be one or more hardware processors, which can each include multiple processor cores. The memory 114 can include both volatile and non-volatile memory, such as Random Access Memory (RAM) and Flash RAM. The process distortion compensation computing system 120 can include various types of computer storage media and devices, which can include the memory 114, to store instructions of programs that run on the processor 112.

The 3D Scan Processing module 116, which can operate locally on the process distortion compensation computing system 120, and present a user interface (UI) employed for displaying, or otherwise rendering, a 3D representation, such as digital nominal model 170 on a display device 125 of the process distortion compensation computing system 120. The display device 125 can be operated using one or more input devices 118 of the process distortion compensation computing system 120 (e.g., keyboard and mouse or touch screen). Note that while shown as separate devices in FIG. 1, the display device 125 and/or input devices 118 can also be integrated with each other and/or with the process distortion compensation computing system 120, such as in a tablet computer.

The 3D Scan Processing module 116 is programmed to analyze, process, and manipulate the scan data (e.g., 2D images, geometric measurements) associated with the scanned object 110, that is generated using scanning techniques employed by 3D scanner 105. The 3D Scan Processing module 116 can generate a 3D representation, such as digital nominal model 170 that is intended to correspond to the shape, size, and dimensions of the physical object 110. In some implementations, the 3D Scan Processing module 116 can employ known systems and techniques for generating a 3D representation from 2D images. Additionally, 3D Scan Processing module 116 can be configured to process and analyze immense amounts of geometric measurements representing the 2D and 3D spatial characteristics associated with object 110 captured using 3D scanner 105.

Also, the 3D Scan Processing module 116 can be programmed to implement a deviation representation (e.g., a digital distortion model 175), modeling, prediction, and compensation techniques for AM accuracy according to the embodiments. In an implementation, the Scan Processing module 116 can be utilized to initiate, and otherwise perform, one or more trials on standard calibration parts using the AM peripheral device 150. In an implementation, the trials use one or more standard calibration parts of known test objects, where the geometric properties corresponding to the standard calibration parts are known. For example, the objects used during the trials can have standard shapes related to 3D modeling, such as cylinders. Based on the trials, a shape deviation (e.g., 2D and/or 3D) can be determined after the object 110 has been manufactured into a corresponding AM built product 180 using the AM techniques of the embodiments. Thus, any shape deviations, or discrepancies, from comparing the corresponding known points of the object's 110 surface geometry and the resulting AM built product 180 can be determined.

According to various non-limiting embodiments, the shape deviations measured in the trials can be an indication of the inaccuracy of characteristics of the product material, and thereby can represent a deformation error between the target working object 110 and the intended 3D AM fabricated product 180. Moreover, the trial can be employed as a calibration technique for the Scan Processing module 116, for example, that can be further utilized during 3D scan data processing. For instance, the Scan Processing module 116 can employ information obtained during trials to predict deformation errors that may result in the fabricated 3D AM product 180, and perform compensation actions (e.g., adjust a digital model) to correct any geometric errors in the digital models generated from 3D scanning. Thus, the embodiments may realize AM techniques that can control and increase accuracy of the design and/or creation of AM products.

Figure 2:
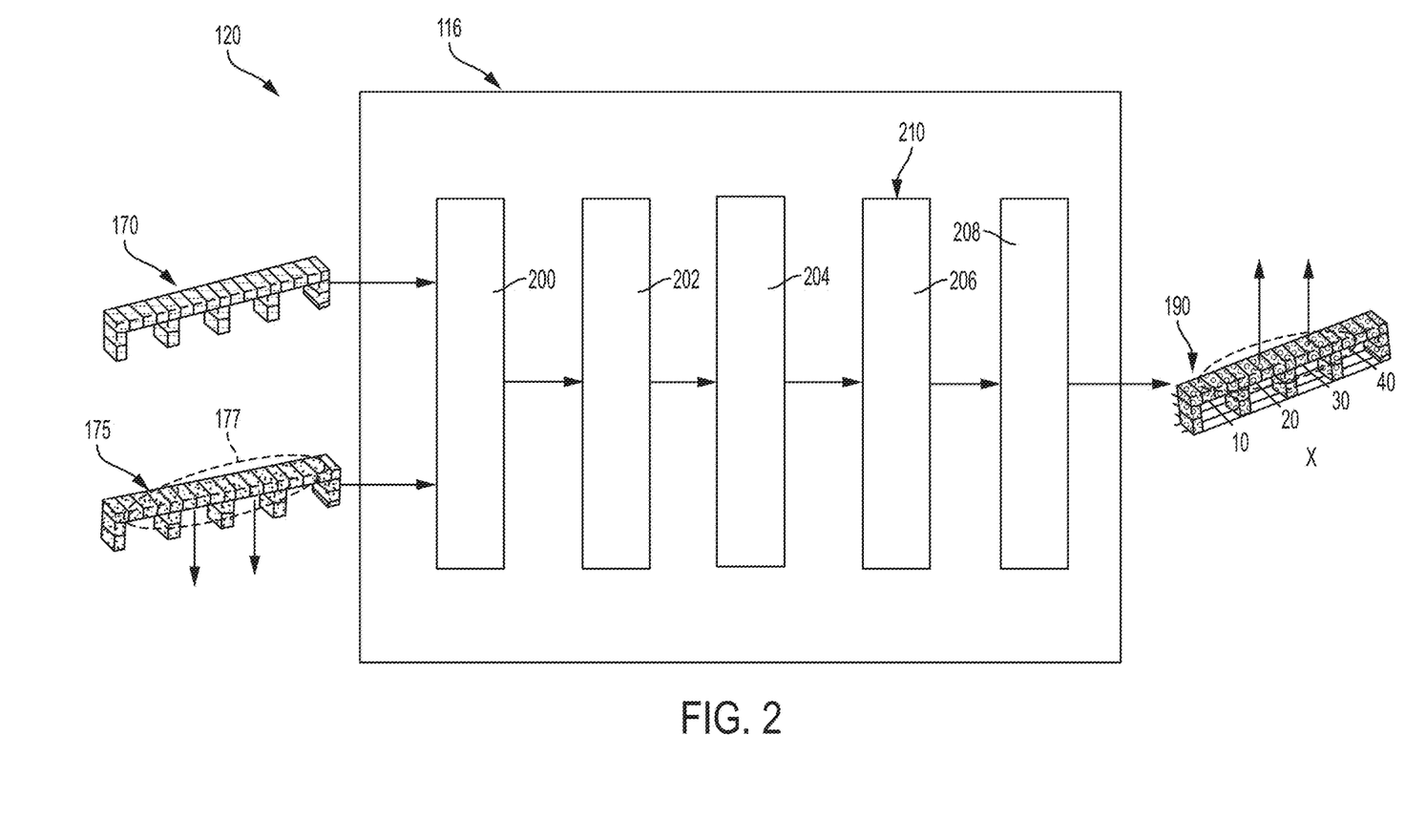
FIG. 2 is a block diagram of a 3D Scan Processing module included in an additive manufacturing process distortion compensation system according to a non-limiting embodiment.

Turning now to FIG. 2, the 3D Scan Processing module 116 will be described in greater detail according to one or more non-limiting embodiments. The 3D Scan Processing module 116 included in the process distortion compensation computing system 120 is configured to determine a digital nominal model 170 that represents a physical target object 110 (see FIG. 1) excluding any distortions, and a digital distortion model 175 that represent the physical target object 110 including at least one distortion (indicated by the downward flexed portion 177). The 3D Scan Processing module 116 determines a material volume difference between the digital nominal model 170 and the digital distortion model 175, and generates a digital compensation model 190 that compensates for the material volume difference. The material volume difference can indicate a change in the volume and/or the shape (e.g., material shrinkage) of a physical portion of the resulting AM fabricated product 180 with respect to the physical target object 110, which is represented by the digital nominal model 170. Thus, a change in the volume and/or the shape of a portion of the digital nominal model 170 indicates a change or deviation in the volume and/or the shape of a physical portion of the physical target object 110. The AM peripheral device 150 (see FIG. 1) receives the digital compensation model 190 in the form of a compensation data file (e.g., a Stereolithography data file), and generates the three-dimensional physical object 180 (see FIG. 1) based on the digital compensation model 190.

The 3D Scan Processing module 116 includes a model reconstruction unit 200, a part alignment unit 202, a configuration compensation unit 204, a compensation iteration unit 206, and a compensation model file generator unit 208. Any one of the model reconstruction unit 200, the part alignment unit 202, the configuration compensation unit 204, the compensation iteration unit 206, and the compensation model file generator unit 208 can be constructed as an electronic hardware controller that includes memory and a processor configured to execute algorithms and computer-readable program instructions stored in the memory.

Figure 3:
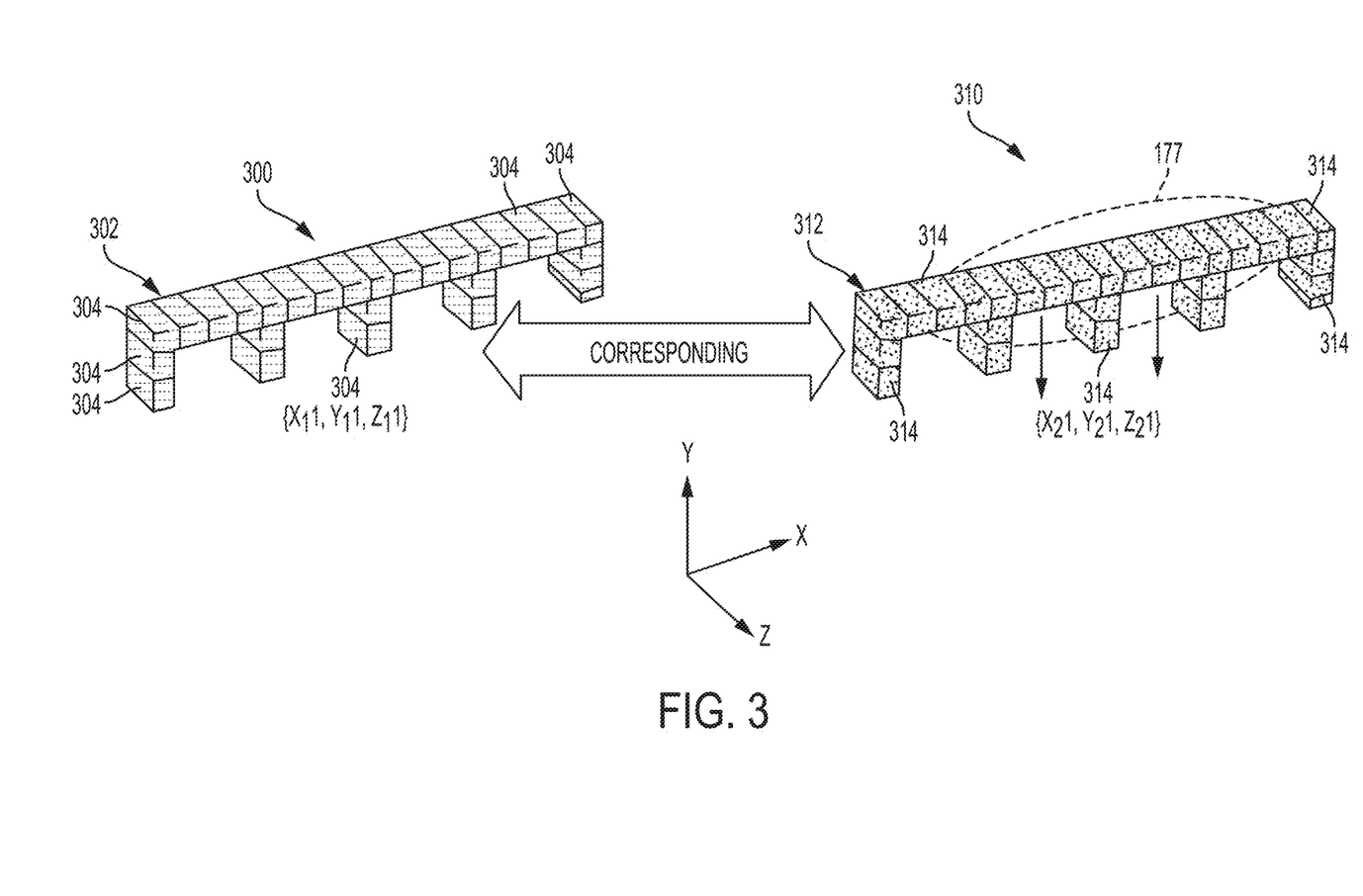
FIG. 3 illustrates a nominal 3D mesh model and a distortion 3D mesh model according to a non-limiting embodiment.

The electronic model reconstruction unit 200 is configured to convert the digital nominal model 170 into a nominal three-dimensional (3D) mesh model 300 ($C_{nominal}$) and to convert the digital distortion model 175 into a distortion 3D mesh model 310 ($C_{distored}$). As illustrated in FIG. 3, the nominal 3D mesh model 300 includes a first mesh grid 302 that defines a plurality of first 3D portions 304 $\{c_i\}_{i=1}^{N}$. The distortion 3D mesh model 310 includes a second mesh grid 312 that defines a plurality of second 3D portions 314 $\{c'_i\}_{i=1}^{N}$. Each second 3D portion 314 of the distortion 3D mesh model 310 corresponds to a matching first 3D portion 304 (i.e., located at the same position) of the nominal 3D mesh model 300. The first mesh grid 302 defines a first density of the digital nominal model 170, and the second mesh grid 312 defines a second density of the digital distortion model 180.

Returning now to FIG. 2, the electronic part alignment unit 202 is configured to extract a plurality of first node points (e.g., 3D coordinates $x_1$, $y_1$, $z_1$). A set of first node points ($x_1 1$, $y_1 1$, $z_1 1$), for example, indicates a position of a given first 3D portion 304 among the plurality of first 3D portions 304. The electronic part alignment unit 202 also extracts a plurality of second node points ($x_2$, $y_2$, $z_2$). A set of second node points ($x_2 1$, $y_2 1$, $z_2 1$), for example, indicates a position of a given second 3D portion 314 among the plurality of second 3D portions 314. The 3D structured defined by the plurality of first node points ($x_1 1$, $y_1 1$, $z_1 1$ ... $x_1 N$, $y_1 N$, $z_1 N$) and the plurality of second node points ($x_2 1$, $y_2 1$, $z_2 1$ ... $x_2 N$, $y_2 N$, $z_2 N$) defines the spatial layout of the nominal 3D mesh model 300 and the distortion 3D mesh model 310, respectively.

The configuration compensation unit 204 is configured to determine a material volume difference based on a comparison between a first total volume ($V_0$) of the nominal 3D mesh model 300 and a second total volume ($V_C$) of the distortion 3D mesh model 310. The first total volume ($V_0$) and the second total volume ($V_C$) can be determined according to the following equations below:

$$V_0 = \Sigma_i V_{0i} \quad [\text{Eq. 1}]$$

$$V_C = \Sigma_i V_{Ci} \quad [\text{Eq. 2}]$$

where $V_{0i}$ is the volume of a given individual first 3D portion 304, and $V_{Ci}$ is the volume of a given individual second 3D portion 314.

In at least one embodiment, the material volume difference is determined by calculating the volume of each first 3D portion 304 among the plurality of first 3D portions 304, and the volume of each second 3D portion 314 among the plurality of second 3D portions 314. The calculated volumes of the second 3D portions 314 are then compared to the calculated volumes of the first 3D portion 304 to determine the material volume difference.

The first 3D portions 304 and the second 3D portion 314 can be defined using non-uniform rational B-splines (NURBS). The NURBS include a set of control points that identify a node 600. The collection of nodes 600 define a surface 602 of the nominal 3D mesh model 300 and the distortion 3D mesh model 310, respectively, and reverse the spatial gap between the nominal 3D mesh model 300 and the distortion 3D mesh model 310. The NURBS surface is able to represent any shape of a surface on the nominal 3D mesh model 300 and the distortion 3D mesh model 310, and allows for defining norm vectors (N) that are normal (i.e., perpendicular) with respect to the NURBS surface (see FIG. 5A).

In at least one embodiment, the comparison includes comparing the calculated volume of a given first 3D portion 304 indicated by a corresponding first node point (e.g., $x_1 1$, $y_1 1$, $z_1 1$) to the calculated volume of a given second 3D portion 314 indicated by a corresponding second node point (e.g., $x_2 1$, $y_2 1$, $z_2 1$) that matches the first node point ($x_1 1$, $y_1 1$, $z_1 1$). Accordingly, a 3D portion volume differential ($\Delta_{3D}$) between a given first 3D portion 304 and a corresponding second 3D portion 314 can be calculated.

In at least one embodiment, the calculated volumes of the first node portion 304 and the second node portion 314 are based on a correlation of a line/angle deviation between the given first 3D portion and the given second 3D portion. More specifically, material distortion ($\varepsilon$) is caused by plastic strain ($\varepsilon_P$), thermal strain ($\varepsilon_T$), and phase transformation strain ($\varepsilon_\Theta$). Among them, plastic strain ($\varepsilon_P$) is the dominative strain that causes deviations in the volume/shape (e.g., material shrinkage) of the AM fabricated product 180 during the cooling phase. In terms of material shrinkage, the amount of a unit shrinkage distortion can be defined as the integration of inherent strain at unit length of section "A", as described by the following equation:

$$W_i = \int \varepsilon_i * dA \quad [\text{Eq. 3}]$$

As known in analytical method, the linear deformation ($\delta$) and angle deformation ($\beta$) is proportional to Wi. Accordingly, $\delta \propto W_i$ and $\beta \propto W_i$.

In addition, the distortion amount (Wi) and the heat input (Q) are linearly correlated. The correlation is constant if physical process remains the same as expressed by the following equation:

$$W_i = \lambda \frac{\alpha}{cp} Q \quad [\text{Eq. 4}]$$

where $\lambda$ is the adjustment coefficient, $\alpha$ is the expansion coefficient, c is the specific heat, p is density, and Q is heat input. Weld heat input, for example, is typically considered to be linearly proportional to a given section area ($F_h$) for a given welding process, and can be expressed as follows:

$$Q = \theta F_h \quad [\text{Eq. 5}]$$

where $\theta$ is the heating coefficient of the applied weld and $F_h$ is the given weld section area.

It can be assumed that the physical process of shrinkage remains the same during compensation, compared to the process that omits compensation. Accordingly, the relationship volume and line/angle deviation between a first (e.g., nominal) 3D portion 304 and a second (e.g., distortion) 3D portion 314 can be derived according to the following equation:

$$\frac{\delta' i}{\delta_i} = \frac{\beta' i}{\beta} = \frac{W' i}{W_i} = \frac{Q' i}{Q_i} = \frac{\theta F' h}{\theta F_h} = \frac{F' _{hl}}{F_h l} = \frac{V_{ci}}{V_{0i}} \quad [\text{Eq. 6}]$$

where ($V_{0i}$) is the volume of an individual first 3D portion 304 of the nominal 3D mesh model 300 and ($V_{Ci}$) is the volume of an individual second 3D portion 314 of the distortion 3D mesh model 310. Based on the equation above, a compensation of the entire distortion 3D mesh model 310 can be calculated based on a volume deviation analysis of the total individual 3D portions 314.

The compensation iteration unit 206 is configured to determine a number of AM process iterations that compensates for a 3D portion volume differential ($\Delta_{3D}$) between at least one given first (nominal) 3D portion 304 and at least one given second (differential) 3D portion 314. The determined number of AM process iterations can modify the volume and/or shape of the least one given second (differential) 3D portion so as to compensate for the 3D portion volume differential ($\Delta_{3D}$). For example, the compensation iteration unit 206 can determine a number of AM iterations to apply to a given second (differential) 3D portion 314 that will compensate for shrinkage that occurs to during the cooling phase. In this manner, topology and dimensions of the AM fabricated product 180 substantially the target working object 110.

In at least one embodiment, the compensation iteration unit 206 determines the need to perform one or more AM process iterations by calculating a difference in volume and/or shape (i.e., a degree of shrinkage) of the at least one given second (differential) 3D portion with respect to the at least one given first (nominal) 3D portion a distortion differential threshold value, and comparing the difference in volume and/or shape to a distortion differential threshold value 210. In at least one embodiment, the distortion differential threshold value 210 is manually selected and input to the 3D Scan Processing module 116. The compensation iteration unit 206 then predicts an amount of volume increase of a given second 3D portion 314 in response to performing an AM process iteration upon the given second 3D portion 314. A modified total volume of the distortion model based on the amount of volume increase is determined, and the modified total volume is compared to the distortion differential threshold value. When the modified total volume is below the distortion differential threshold value, the compensation iteration unit 206 determines the need to add one or more subsequent AM process iteration. When, however, the modified total volume is equal to or exceeds the distortion differential threshold value, the compensation iteration unit 206 determines that no further AM process iterations are necessary.

Figure 5A:
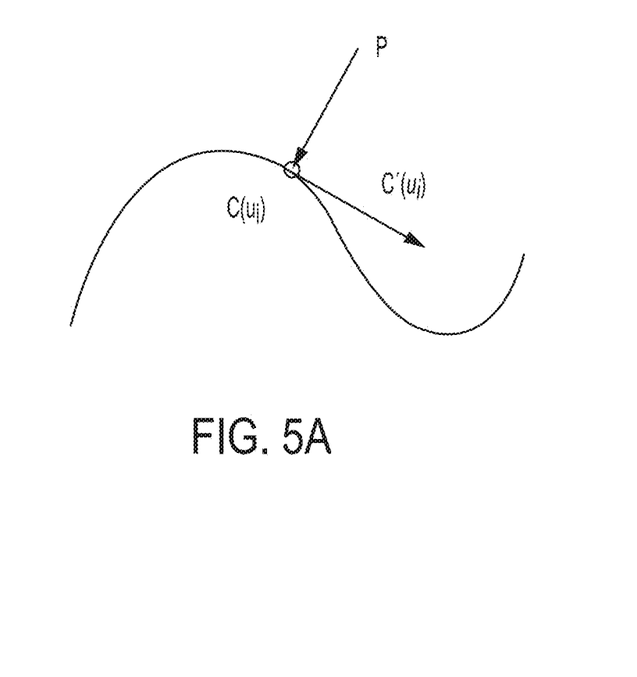
FIG. 5A illustrates a norm vector of a point P on a non-uniform rational B-splines (NURBS) surface.
Figure 5B:
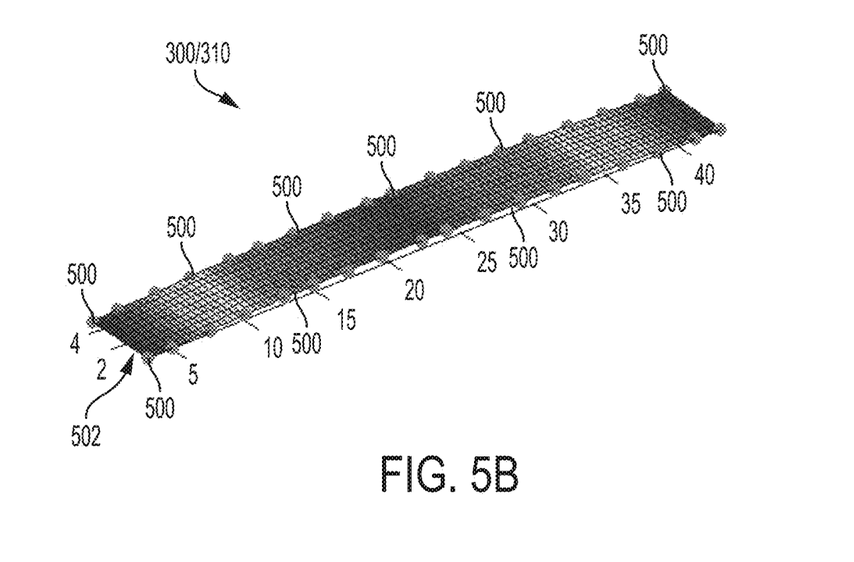
FIG. 5B illustrates a mesh surface forming on digital mesh model according to a non-limiting embodiment.

A compensation iteration process can apply an AM process iteration at a given point 500 P=(x,y,z) (e.g. the points corresponding to a 3D portion) and a NURBS surface 502 defined as c(u, v). The points c(u, v) as the project of P can be determined by solving for the point inverse of c(u', v')=P as illustrated in FIGS. 5A and 5B. The point inverse can be solved using the mesh grids to define the NURBS surface c(u, v), where u is from 0 to 1 with step equals to $10^3$, v=[0, 1]. Accordingly, the parameters create 1000×2 points on the NURBS surface. For a given point (P), find its nearest neighbor in the mesh grid. $P(x,y,z) \cong c(u_i, v_i)$. In other words, the nearest neighbor for a given point (P) is searched to identify its position on the parametric NURBS surface (c).

Figure 6:
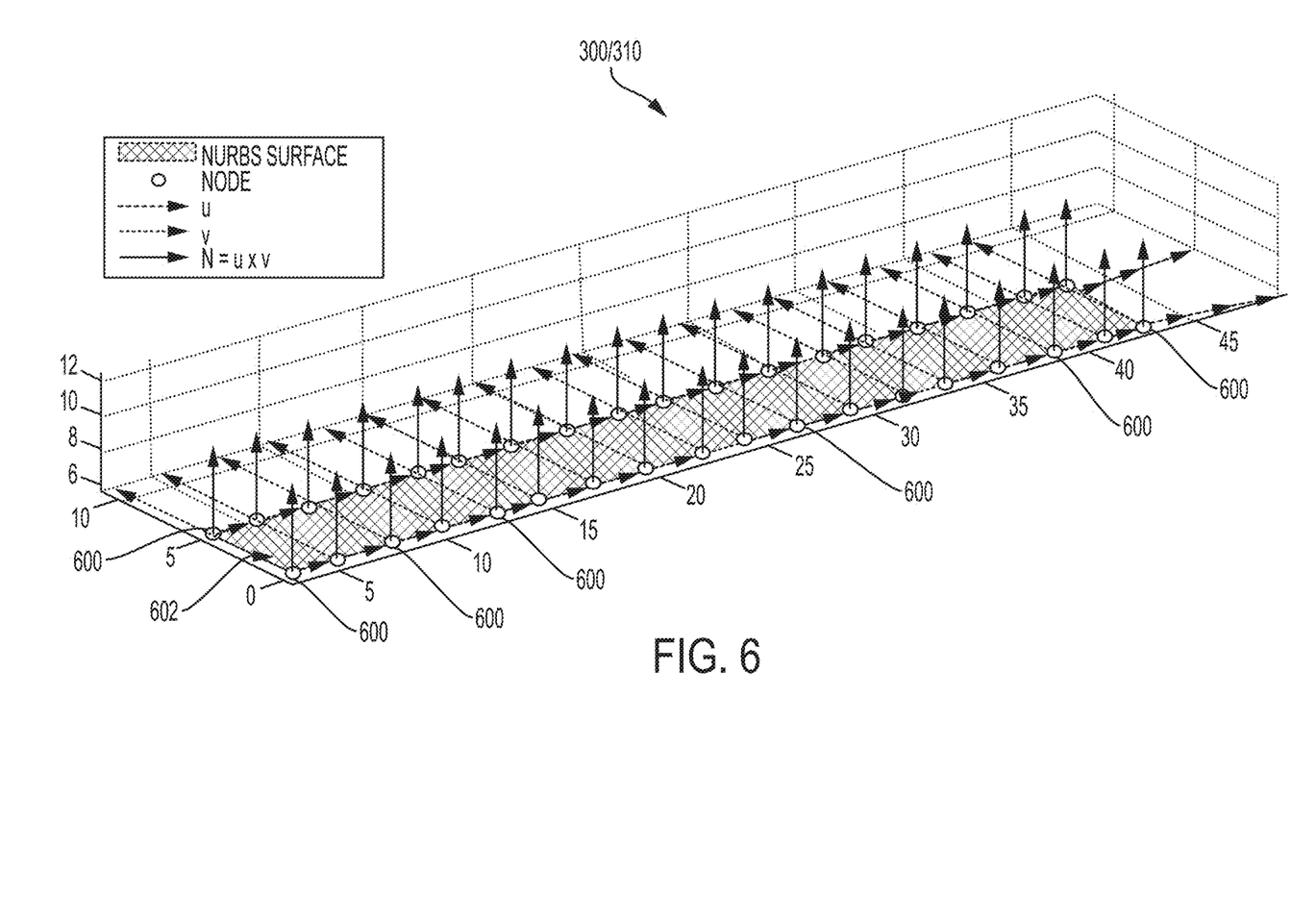
FIG. 6 illustrates node movement in a compensating AM iteration process according to a non-limiting embodiment.

When performing the compensation iteration process, the expansion of a given distorted model is decided by straight forward minimal energy principle. Because we are able to know the norm vectors (N=u×v) on any point of the NURBS surface, as shown in FIG. 6, the compensation is achieved by performing AM iterations on individual 3D portions (e.g., 3D portions 314) along these norm vectors (N). Each AM iteration modifies the volume ($V_{Ci}$) and/or shape of the given individual 3D portion 314. Accordingly, the total volume ($V_C$) of the 3D distortion model 310 will be modified in each iteration step and can be recalculated to determine a modified total volume ($V'_C$).

The compensation model file generator unit 208 is configured to generate a digital file indicating the modified total volume of the digital compensation model 190. In at least one embodiment, the compensation model file generator unit 208 generates the compensation model file when the modified total volume is equal to or exceeds the distortion differential threshold value. Accordingly, the AM peripheral device 150 receives the compensation model file indicating the number of AM processing iterations needed to compensate for predicted distortions, and generates the AM fabricated product 180 according to the AM processing iterations so as to substantially reduce or completely avoid the distortions. In this manner, the physical AM fabricated product 180 is fabricated while compensating for distortions such as material shrinkage, for example, and is formed with a topology and dimensions that match or substantially the physical target object 110.

Figure 4:
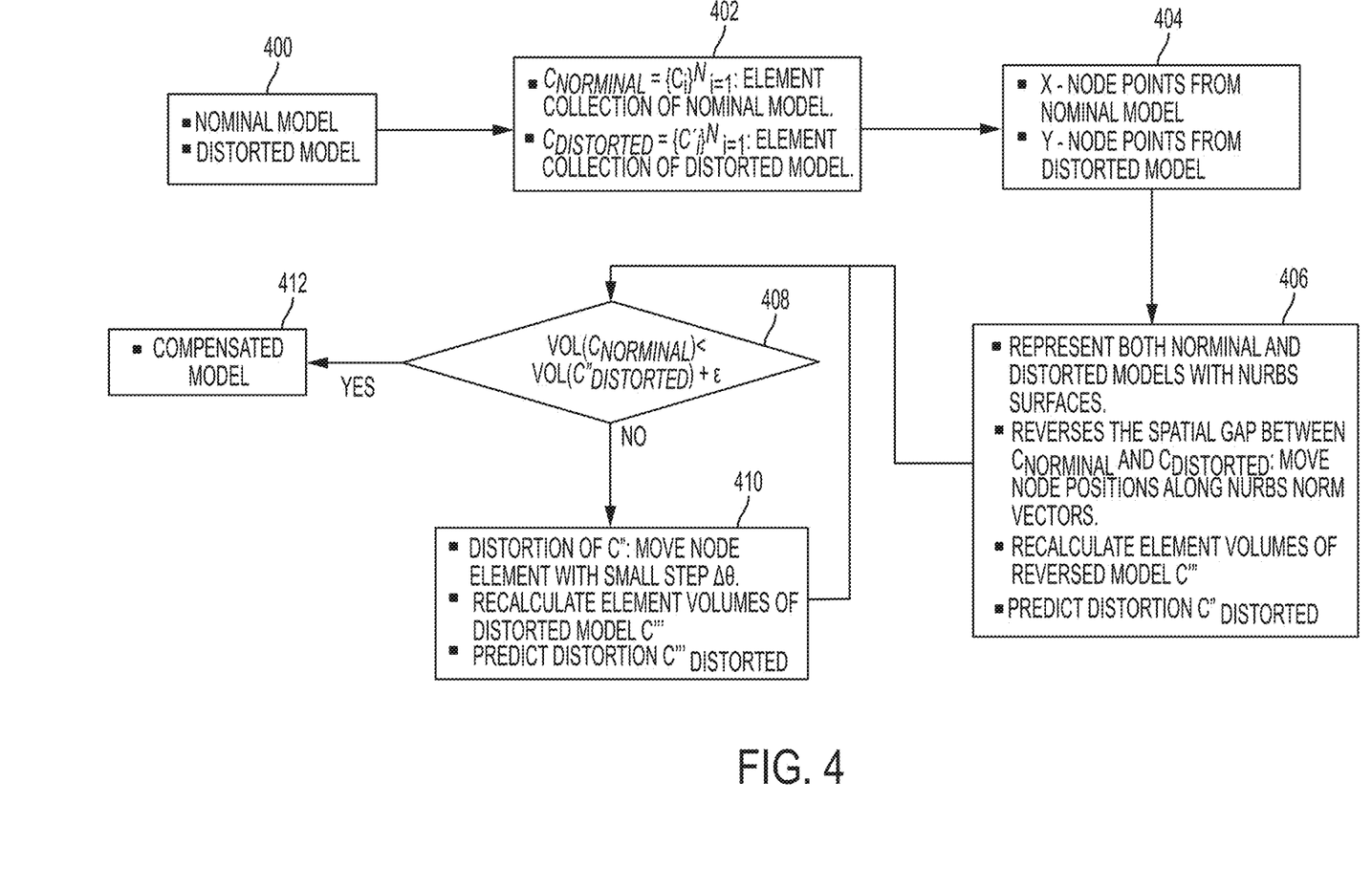
FIG. 4 is a flow diagram illustrating a method of fabricating a physical three-dimensional (3D) product according to a non-limiting embodiment.

Turning now to FIG. 4, a flow diagram illustrates a method of fabricating a physical three-dimensional (3D) product according to a non-limiting embodiment. The method begins at operation 400 where a digital nominal model 170 and a digital distortion model 175 are input to an AM process distortion compensation computing system 120.

At operation 402, an electronic model reconstruction unit 200 converts the digital nominal model 170 into a nominal three-dimensional (3D) mesh model 300 ($C_{nominal}$), and converts the digital distortion model 175 into a distortion 3D mesh model 310 ($C_{distored}$). In at least one embodiment, the electronic model reconstruction unit 200 performs the conversion by generating a first mesh grid 302 upon the digital nominal model 170 and a second mesh grid 312 upon the digital distortion model 175. The first mesh grid 302 defines a plurality of first 3D portions 304 $\{c_i\}_{i=1}^N$ corresponding to the digital nominal model 170. The second mesh grid 312 defines a plurality of second 3D portions 314 $\{c'_i\}_{i=1}^N$ corresponding to the digital distortion model 175.

At operation 404, a plurality of first node points (e.g., 3D coordinates $x_1, y_1, z_1$) and a plurality of second node points (e.g., 3D coordinates $x_2, y_2, z_2$). A set of first node points ($x_1 1, y_1 1, z_1 1$), for example, indicates a position of a given first 3D portion 304 among the plurality of first 3D portions 304, while a set of second node points ($x_2 1, y_2 1, z_2 1$), for example, indicates a position of a given second 3D portion 314 among the plurality of second 3D portions 314. Accordingly, the 3D structured defined by the plurality of first node points ($x_1 1, y_1 1, z_1 1 \ldots x_1 N, y_1 N, z_1 N$) and the plurality of second node points ($x_2 1, y_2 1, z_2 1 \ldots x_2 N, y_2 N, z_2 N$) defines the spatial layout of the nominal 3D mesh model 300 and the distortion 3D mesh model 310, respectively.

At operation 406, a material volume difference is determined based on a comparison between a first total volume ($V_0$) of the nominal 3D mesh model 300 and a second total volume ($V_C$) of the distortion 3D mesh model 310. In at least one embodiment, the volume of an individual 3D portion 304 and 314 is calculated. Accordingly, the volume of every individual 3D portion is calculated and totaled to obtain the total volume ($V_0, V_C$).

At operation 408, the total volume ($V_c$) of the distortion 3D mesh model 310 is compared to a distortion threshold value. When the total volume ($V_c$) of the distortion 3D mesh model 310 is within (i.e. satisfies) the distortion threshold value, the method proceeds to operation 412 and a compensation model 190 is generated. The compensation model 190 is saved in a data, forwarded to an AM peripheral device (e.g., a 3D printer) to fabricate the AM physical product, and the method ends.

When, however, the total volume ($V_c$) of the distortion 3D mesh model 310 is above or below the distortion threshold, the method determines the need to apply an AM processing iteration to one or more of the 3D portions 314 of the distortion 3D mesh model 310 at operation 410. The AM processing iteration modifies the total volume ($V'_C$) of the distortion 3D mesh model 310. The method then returns to operation 408, and compares the modified volume ($V'_C$) to the distortion threshold. When the total volume ($V_c$) of the distortion 3D mesh model 310 is within (i.e. satisfies) the distortion threshold value, the method proceeds to operation 412. When, however, $V'_c$ is less to or exceeds the distortion threshold value, the compensation iteration unit 206 determines at least one additional AM processing iteration is to be applied to the one or more of the 3D portions 314 of the distortion 3D mesh model 310 at operation 410. The method returns again to operation 408 to compare the newly modified volume ($V'_C$) to the distortion threshold. This process continues until the modified total volume ($V'_c$) is within (i.e. satisfies) the distortion threshold value. Once the modified total volume ($V'_c$) satisfies the distortion threshold value, the method proceeds to operation 412.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As used herein, the term "module" or "unit" can refer to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An additive manufacturing (AM) system comprising:
   a process distortion compensation computing system configured to determine a digital nominal model that represents a physical target object excluding a distortion, and a digital distortion model that represents the physical target object including at least one distortion; and
   an AM peripheral device configured to form a three-dimensional physical object based on a digital compensation model,
   wherein the process distortion compensation computing system determines a material volume difference between the digital nominal model and the digital distortion model, and generates the digital compensation model that compensates for the material volume difference,
   wherein the process distortion compensation computing system comprises:
   an electronic model reconstruction unit configured to convert the digital nominal model into a nominal three-dimensional (3D) mesh model ($C_{nominal}$) and to convert the digital distortion model into a distortion 3D mesh model ($C_{distored}$); and
   a configuration compensation unit configured to determine the material volume difference based on a comparison between a first total volume of the nominal 3D mesh model and a second total volume of the distortion 3D mesh model.

2. The AM system of claim 1, wherein the nominal 3D mesh model includes a first mesh grid that defines a plurality of first 3D portions $\{c_i\}^N_{i=1}$, and wherein the distortion 3D mesh model includes a second mesh grid that defines a plurality of second 3D portions $\{c'_i\}N_{i=1}$.

3. The AM system of claim 2, wherein the first mesh grid defines a first density of the digital nominal model, and wherein the second mesh grid defines a second density of the digital distortion model.

4. The AM system of claim 2, wherein the process distortion compensation computing system comprises:
   an electronic part alignment unit configured to extract a plurality of first node points from the nominal three-dimensional (3D) mesh model ($C_{nominal}$), each first node point indicating a position of a given first 3D portion among the plurality of first 3D portions, and a plurality of second node points from the distortion 3D mesh mode ($C_{distortion}$), each second node point indicating a position of a given second 3D portion among the plurality of second of 3D portions; and
   a compensation iteration unit configured to determine at least one AM process iteration that compensates for a 3D portion volume differential ($\Delta_{3D}$) between at least one given first 3D portion and at least one given second 3D portion.

5. The AM system of claim 4, wherein the at least one AM process iteration modifies at least one of the volume and shape of the least one given second 3D portion so as to compensate for the 3D portion volume differential ($\Delta_{3D}$).

6. The AM system of claim 5, wherein the first total volume of the nominal 3D mesh model is based on the equation $V_0 = \Sigma_i V_{oi}$, and the second total volume of the distortion 3D mesh model is based on the equation $V_c = \Sigma_i V_{ci}$.

7. The AM system of claim 5, wherein the comparison further comprises:
   determining a nominal volume of each first 3D portion among the plurality of first 3D portions;
   determining a deformation volume of each second 3D portion among the plurality of second 3D portions; and
   comparing the calculated deformation volumes to the calculated nominal volumes to determine the material volume difference.

8. The AM system of claim 7, wherein the comparing further comprises:

comparing the calculated volume of a given first 3D portion indicated by a corresponding first node point to the calculated volume of a given second 3D portion indicated by a corresponding second node point that matches the first node point; and determining a 3D portion volume differential ($\Delta_{3D}$) between the given first 3D portion and the given second 3D portion.

9. The AM system of claim 7, wherein the calculated volume is based on a correlation of a line/angle deviation between the given first 3D portion and the given second 3D portion.

10. The AM system of claim 9, wherein the correlation is expressed as:

$$\frac{\delta\prime_i}{\delta_i} = \frac{\beta\prime_i}{\beta} = \frac{W\prime_i}{W_i} = \frac{Q\prime_i}{Q_i} = \frac{\theta F\prime_h}{\theta F_h} = \frac{F\prime_{hl}}{F_h l} = \frac{V_{ci}}{V_{0i}}.$$

11. The AM system of claim 5, wherein determining the at least one AM process iteration comprises:
determining a distortion differential threshold value;
determining a difference in volume of the at least one given second 3D portion with respect to the at least one given first 3D portion;
predicting an amount of volume increase of the at least one given second 3D portion in response to performing an AM process iteration on the at least one given second 3D portion;
determining a modified total volume of the distortion model based on the amount of volume increase;
comparing the modified total volume to the distortion differential threshold value; and
determining at least one additional AM process iteration when the modified total volume is below the distortion differential threshold value.

12. The AM system of claim 11, further comprising a compensation model file generator unit configured to generate a digital file indicating the modified total volume of the digital compensation model.

13. The AM system of claim 12, wherein the compensation model file generator unit generates the compensation model file when the modified total volume is equal to or exceeds the distortion differential threshold value.

14. The AM system of claim 12, wherein the compensation model file is a Stereolithography data file, and the AM peripheral device is a 3D printer.

15. A method of fabricating a physical three-dimensional (3D) product using an additive manufacturing (AM) system, the method comprising:

generating a digital nominal model that represents a physical target object excluding a distortion;
generating a digital distortion model that represent the physical target object including at least one distortion;
determining a material volume difference between the digital nominal model and the digital distortion model;
generating a digital compensation model that compensates for the material volume difference; and
forming, via an electronic AM peripheral device, the physical 3D product based on the digital compensation model,
wherein determining the material volume difference comprises:
converting the digital nominal model into a nominal three-dimensional (3D) mesh model ($C_{nominal}$);
converting the digital distortion model into a distortion 3D mesh model ($C_{distorted}$); and
determining the material volume difference based on a comparison between a first total volume of the nominal 3D mesh model and a second total volume of the distortion 3D mesh model.

16. The method of claim 15, further comprising:
generating the nominal 3D mesh model based on a first mesh grid that defines a plurality of first 3D portions $\{c_i\}^N_{i=1}$ of the nominal 3D mesh model; and
generating the distortion 3D mesh model based on a second mesh grid that defines a plurality of second 3D portions $\{c'_i\}^N_{i=1}$ of the distortion 3D model.

17. The method of claim 16, further comprising:
extracting a plurality of first node points from the nominal three-dimensional (3D) mesh model ($C_{nominal}$), each first node point indicating a position of a given first 3D portion among the plurality of first 3D portions;
extracting a plurality of second node points from the distortion 3D mesh mode ($C_{distortion}$), each second node point indicating a position of a given second 3D portion among the plurality of second of 3D portions;
determining at least one AM process iteration that compensates for a 3D portion volume differential ($\Delta_{3D}$) between at least one given first 3D portion and at least one given second 3D portion; and
performing, via the AM peripheral device, the at least one AM process iteration to fabricate the 3D physical product that excludes the at least one distortion.

18. The method of claim 17, wherein the at least one AM process iteration modifies at least one of the volume and shape of the least one given second 3D portion so as to compensate for the 3D portion volume differential ($\Delta_{3D}$).

* * * * *